United States Patent
Vaughan et al.

(10) Patent No.: US 12,258,140 B2
(45) Date of Patent: Mar. 25, 2025

(54) PROPULSOR BRAKE LOCK

(71) Applicant: HONEYWELL INTERNATIONAL INC., Charlotte, NC (US)

(72) Inventors: Ronald Vaughan, Tempe, AZ (US);
James N. Quitmeyer, Tempe, AZ (US);
Everett Canepa, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 42 days.

(21) Appl. No.: 18/310,679

(22) Filed: May 2, 2023

(65) Prior Publication Data

US 2024/0278923 A1  Aug. 22, 2024

Related U.S. Application Data

(60) Provisional application No. 63/486,073, filed on Feb. 21, 2023.

(51) Int. Cl.
| | |
|---|---|
| *B64D 31/14* | (2006.01) |
| *B64C 11/00* | (2006.01) |
| *B64D 27/30* | (2024.01) |
| *B64D 31/08* | (2006.01) |
| *B64D 35/08* | (2006.01) |

(52) U.S. Cl.
CPC .......... *B64D 31/08* (2013.01); *B64C 11/002* (2013.01); *B64D 27/30* (2024.01); *B64D 31/14* (2013.01); *B64D 35/08* (2013.01)

(58) Field of Classification Search
CPC ........ B64D 27/24; B64D 27/30; B64D 27/32; B64D 35/021; B64D 35/08; B64D 35/00; B64D 31/14; B64D 31/16; B64C 11/00
See application file for complete search history.

(56) References Cited

U.S. PATENT DOCUMENTS

2017/0234217 A1\*  8/2017  Wotzak .................. F02C 6/206
                                                       416/169 R

FOREIGN PATENT DOCUMENTS

EP            3546352 A1 \* 10/2019  .............. B60L 53/16

\* cited by examiner

*Primary Examiner* — Tye William Abell
*Assistant Examiner* — Justin Michael Heston
(74) *Attorney, Agent, or Firm* — Lorenz & Kopf LLP

(57) ABSTRACT

A propulsor brake lock system includes an aircraft propulsor, a reduction gear assembly, a brake shaft, and a brake assembly. The aircraft propulsor includes a propeller having a propeller input shaft coupled thereto. The reduction gear assembly includes at least an input gear and an output gear. The input gear and output gear are both rotatable with the propeller input shaft. The brake shaft is coupled to, and is rotatable with, the output gear. The brake assembly is coupled to the brake shaft and is moveable between a disengaged position, in which the brake shaft may rotate whenever the output gear rotates, and an engaged position, in which the brake shaft is prevented from rotating, thereby preventing rotation of the output gear, the input gear, and the propeller input shaft.

16 Claims, 3 Drawing Sheets

PROPULSOR BRAKE LOCK

CROSS-REFERENCE TO RELATED APPLICATIONS

The present application claims benefit of prior filed U.S. Provisional Patent Application No. 63/486,073, filed Feb. 21, 2023, which is hereby incorporated by reference herein in its entirety.

TECHNICAL FIELD

This disclosure relates to aircraft propulsors and, more particularly, to a propulsor brake lock that selectively locks a lift propulsor during cruise operations of the aircraft and, if needed or desired, while the aircraft is not operating.

BACKGROUND

The market for Urban Air Mobility (UAM) and Unmanned Aerial Vehicle (UAV) aircraft is emerging and is seen as the future of aviation for both personnel transport over short distances (e.g., air taxis), search and rescue operations, aerial inspections, and transport and delivery of various supplies, just to name a few. The aircraft envisioned for use as UAM/UAV aircraft are typically configured as vertical take-off and landing (VTOL) aircraft, and more preferably as electric VTOL (eVTOL) aircraft. These aircraft, as well as VTOL aircraft presently used in other domains, can selectively operate in both a helicopter mode and a fixed-wing mode. More specifically, VTOL aircraft can take-off, hover, and land like a helicopter and cruise like a fixed-wing aircraft.

Some eVTOL aircraft configurations are implemented with lift propulsors that are dedicated to take-off, hover, and landing operations. Thus, during cruise operations, it is desirable to lock these lift propulsors in-line with the airstream to prevent air flow and control disturbances, and to do so without undue and unwanted battery discharge.

Hence, there is a need for a propulsor lock system for a UAM/UAV aircraft that will lock one or more lift propulsors in-line during cruise operations of the aircraft without undue and unwanted battery discharge. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a propulsor brake lock system includes an aircraft propulsor, a reduction gear assembly, a brake shaft, and a brake assembly. The aircraft propulsor includes a propeller having a propeller input shaft coupled thereto. The reduction gear assembly includes at least an input gear and an output gear. The input gear and output gear are both rotatable with the propeller input shaft. The brake shaft is coupled to, and is rotatable with, the output gear. The brake assembly is coupled to the brake shaft and is moveable between a disengaged position, in which the brake shaft may rotate whenever the output gear rotates, and an engaged position, in which the brake shaft is prevented from rotating, thereby preventing rotation of the output gear, the input gear, and the propeller input shaft.

In another embodiment, an aircraft includes a fuselage, a plurality of propulsors, and a propulsor brake lock system. Each propulsor is coupled to the fuselage and includes a propeller having a propeller input shaft coupled thereto. The propulsor brake lock system is associated with at least one of the propulsors and includes a reduction gear assembly, a brake shaft, and a brake assembly. The reduction gear assembly includes at least an input gear and an output gear. The input gear and output gear are rotatable with the propeller input shaft of the associated at one propulsor. The brake shaft is coupled to, and is rotatable with, the output gear. The brake assembly is coupled to the brake shaft and is moveable between a disengaged position, in which the brake shaft may rotate whenever the output gear rotates, and an engaged position, in which the brake shaft is prevented from rotating, thereby preventing rotation of the output gear, the input gear, and the propeller input shaft.

Furthermore, other desirable features and characteristics of the propulsor brake lock system will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
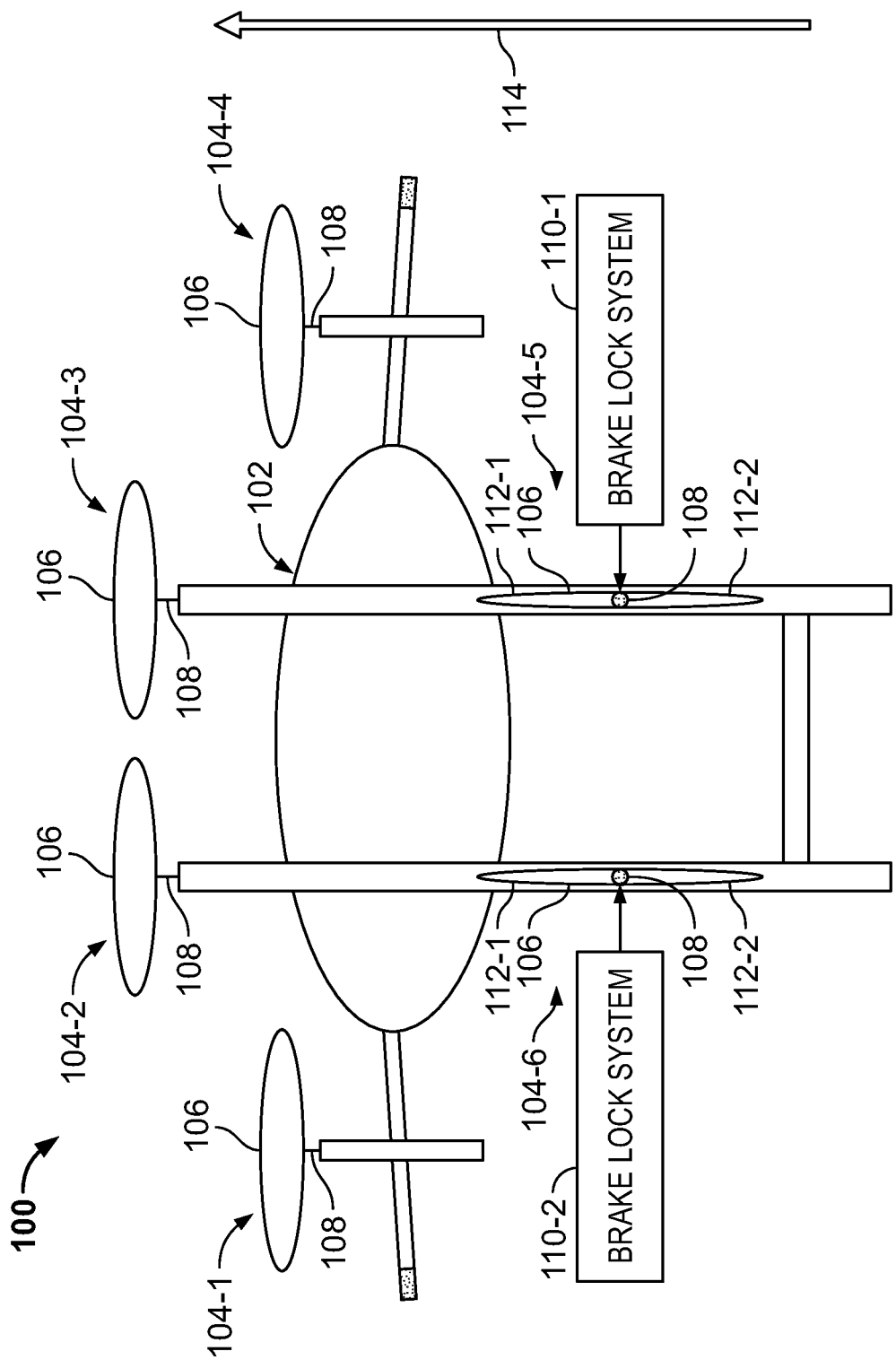
FIG. 1 depicts a top view of a simplified representation of one embodiment of an aircraft.

Referring first to FIG. 1, a top view of a simplified representation of one embodiment of an aircraft 100 is depicted. The depicted aircraft 100, which is preferably configured to be implemented as either an Urban Air Mobility (UAM) or an Unmanned Aerial Vehicle (UAV) aircraft, includes a fuselage 102 and a plurality of propulsors 104. In the depicted embodiment, the aircraft 100 includes six propulsors 104 (e.g., 104-1, 104-2, 104-3, . . . 104-6). Four of the propulsors 104 (e.g., 104-1, 104-2, 104-3, 104-4) are used to supply both vertical and horizontal thrust, while two of the propulsors 104 (e.g., 104-5, 104-6) are dedicated lift propulsors and thus supply only vertical thrust. It will be appreciated, however, that the total number of propulsors 104, and the number of dedicated lift propulsors may vary.

No matter the number of propulsors 104, each of the propulsors 104 is coupled to the fuselage 102, and each includes a propeller 106 that is coupled to a propeller input shaft 108. Each of the propeller input shafts 108 is coupled to, and receives a torque supplied by, a dedicated electric motor (not illustrated in FIG. 1). This torque, in turn, rotates the associated propellers 106.

Figure 2:
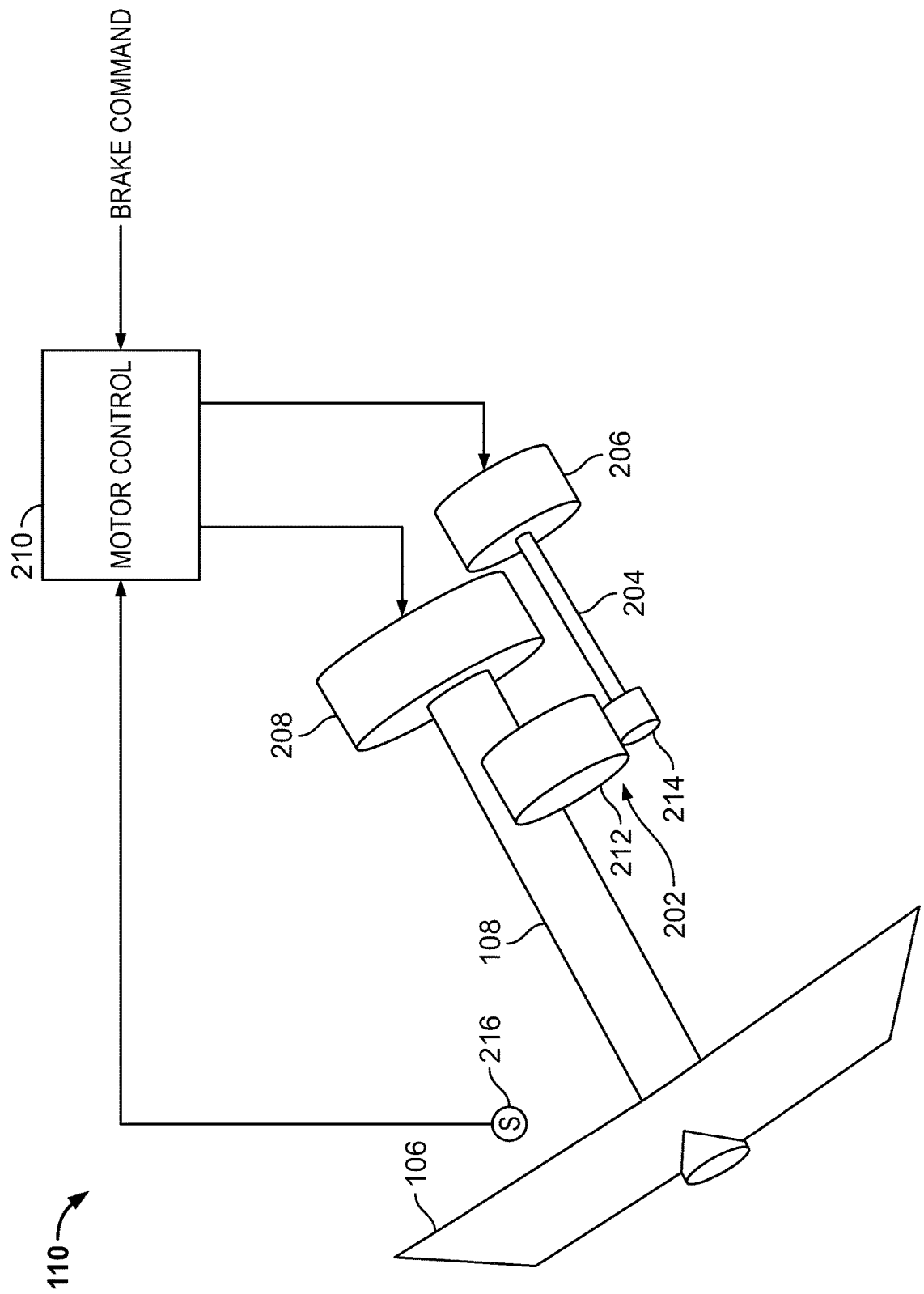
FIG. 2 depicts an example embodiment a propulsor brake lock system.

During cruise operations of the aircraft 100, the lift propulsors 104-5, 104-6 are locked in-line with the airstream (as depicted in FIG. 1) to prevent air flow and control disturbances. To implement this locking function, the aircraft 100 additionally includes a propulsor brake lock system 110 associated with each of the lift propulsors 104-5, 104-6. Thus, in the depicted embodiment, the aircraft 100 includes two propulsor brake lock systems 110-1, 110-2. An example embodiment of one of the propulsor brake lock systems 110 is depicted in FIG. 2, and with reference thereto will now be described.

The depicted propulsor brake lock system 110 includes a reduction gear assembly 202, a brake shaft 204, and a brake assembly 206. Before describing these components further, as FIG. 2 further depicts, and as was alluded to above, an electric motor 208 is coupled to the propeller input shaft 108 and a motor control 210 is in operable communication with the electric motor 208. The electric motor 208, which may be implemented using any one of numerous types of DC (preferred) or AC motor, is configured to selectively supply torque to the propeller input shaft 108. The motor control 210 is configured to selectively energize, and thereby control the torque supplied by, the electric motor 208.

The depicted reduction gear assembly 202 includes at least an input gear 212 and an output gear 214, both of which are rotatable with the propeller input shaft 108 of the associated propulsor 104-5 or 104-6. Although the depicted reduction gear assembly 202 includes only two gears—the input gear 212 and output gear 214—it will be appreciated that in other embodiments, the reduction gear assembly 202 could, if needed, include more than this number of gears. It will additionally be appreciated that propeller input shaft 108 may be connected to the input gear 212 or it may include a spline gear that meshes with the input gear 212.

Regardless of the propeller input shaft 108/input gear 212 configuration, it is seen that the brake shaft 204 is coupled to, and is rotatable with, the output gear 214. That is, it is rotatable with the output gear 214 unless it is prevented from doing so by the brake assembly 206.

The brake assembly 206 is coupled to the brake shaft 204 and is moveable between a disengaged position and an engaged position. In the disengaged position, the brake shaft 204 may rotate whenever the output gear 214 rotates. However, in the engaged position, the brake shaft 204 is prevented from rotating, thereby preventing rotation of the output gear 214, the input gear 212, and the propeller input shaft 108.

In the depicted embodiment, it is seen that the motor control 210 is in operable communication with the brake assembly 206 and is further configured to selectively command the brake assembly 206 to move between the disengaged position and the engaged position. In other embodiments, a separate brake control could be used to control the position of the brake assembly 206.

It will be appreciated that the brake assembly 206 may be variously configured and implemented. For example, in one embodiment, the brake assembly 206 may be implemented using a power-off-for-brake release configuration. With this implementation, the brake assembly 206 is adapted to be selectively electrically energized and is configured, when not electrically energized, to move to and/or remain in the disengaged position, and is further configured, when electrically energized to move to and/or remain in the engaged position. This implementation allows for rotation of the propeller input shaft 108 and associated propeller 106 in the highly unlikely event of a single-point brake or controller failure. It will additionally be appreciated the brake assembly 206 could be implemented as a power-off-for-brake engage in the event that a single point failure is acceptable.

In another embodiment, the brake assembly 206 is implemented using a bi-stable brake assembly configuration. With this implementation, the brake assembly 206 is coupled to receive an electrical pulse (e.g., from the motor control 210) and is configured such that, when the brake assembly 206 is in the disengaged position, it moves, upon receipt of the electrical pulse, from the disengaged position to the engaged position. Conversely, when the brake assembly 206 is in the engaged position, it moves, upon receipt of the electrical pulse, from the engaged position to the disengaged position. This type of brake assembly 206 does not require power to maintain the engaged or disengaged position and is preferable if a single-point failure is not a concern. If, however, a single-point failure is a concern, a dual-channel bi-stable brake assembly may be used, in which each independent channel is adapted to selectively receive the electrical pulse. One non-limiting example of a suitable bi-stable brake assembly is manufactured by Valcor Engineering Corporation. It should be noted that both types of brake assembly 206 configurations may be configured to provide brake position feedback to the motor control 210.

Regardless of the specific implementation and configuration of the brake assembly 206, the propulsor brake lock system 110 may also include a propeller position sensor 216. The propeller position sensor 216, which may be implemented using any one of numerous types of position sensors, is configured to sense the rotational position of the propeller 106 and supply a propeller position sensor signal indicative thereof to the motor control 210.

The motor control 210 is coupled to receive the propeller position sensor signal and is further configured to process the propeller position signal to determine when the propeller 106 is in a predetermined rotational position. Although the predetermined rotational position may vary, and as FIG. 1 depicts, the predetermined rotational position is such that the propeller blades 112 are aligned with the airflow when the aircraft 100 is moving in the direction indicated by arrow 114, with one propeller blade 112-1 at 0-degrees (+/−2) and the other propeller blade 112-2 at 180-degrees (+/−2).

Returning to FIG. 2, it is seen that the motor control 210 is additionally coupled to receive a brake command. This command may be supplied from an onboard system and/or from a pilot-operated user interface. Regardless of the source of the command, the motor control 210 is further configured, upon receipt of the brake command, to command the brake assembly 206 to move to the engaged position only when the propeller 106 is in the predetermined position.

In the embodiment depicted in FIG. 2, only a single electric motor 208 was coupled to the propeller shaft 108. In other embodiments, such as the one depicted in FIG. 3, two electric motors may be used. In particular, a first electric motor 302-1 is coupled to the propeller input shaft 108 and is configured to selectively supply torque thereto, and a second electric motor 302-2 is coupled to the propeller input shaft 108 and is also configured to selectively supply torque thereto.

As may be appreciated, a dual-channel motor control 304 is used to support the two motors 302. The dual-channel motor control 304 includes a first channel 306-1 and a second channel 306-2. The first channel 306-1 is in operable communication with the first electric motor 302-1, and the second channel 306-2 in operable communication with the second electric motor 302-2. The dual-channel motor control 304 is configured such that only one of the first channel 306-1 or the second channel 306-2 is active. Specifically, when the first channel 306-1 is active, the first channel 306-1 is operable to selectively energize, and thereby control the torque supplied by, the first electric motor 302-1. Alternatively, when the second channel 306-2 is active, the second channel 306-2 is operable to selectively energize, and thereby control the torque supplied by, the second electric motor 302-2.

Figure 3:
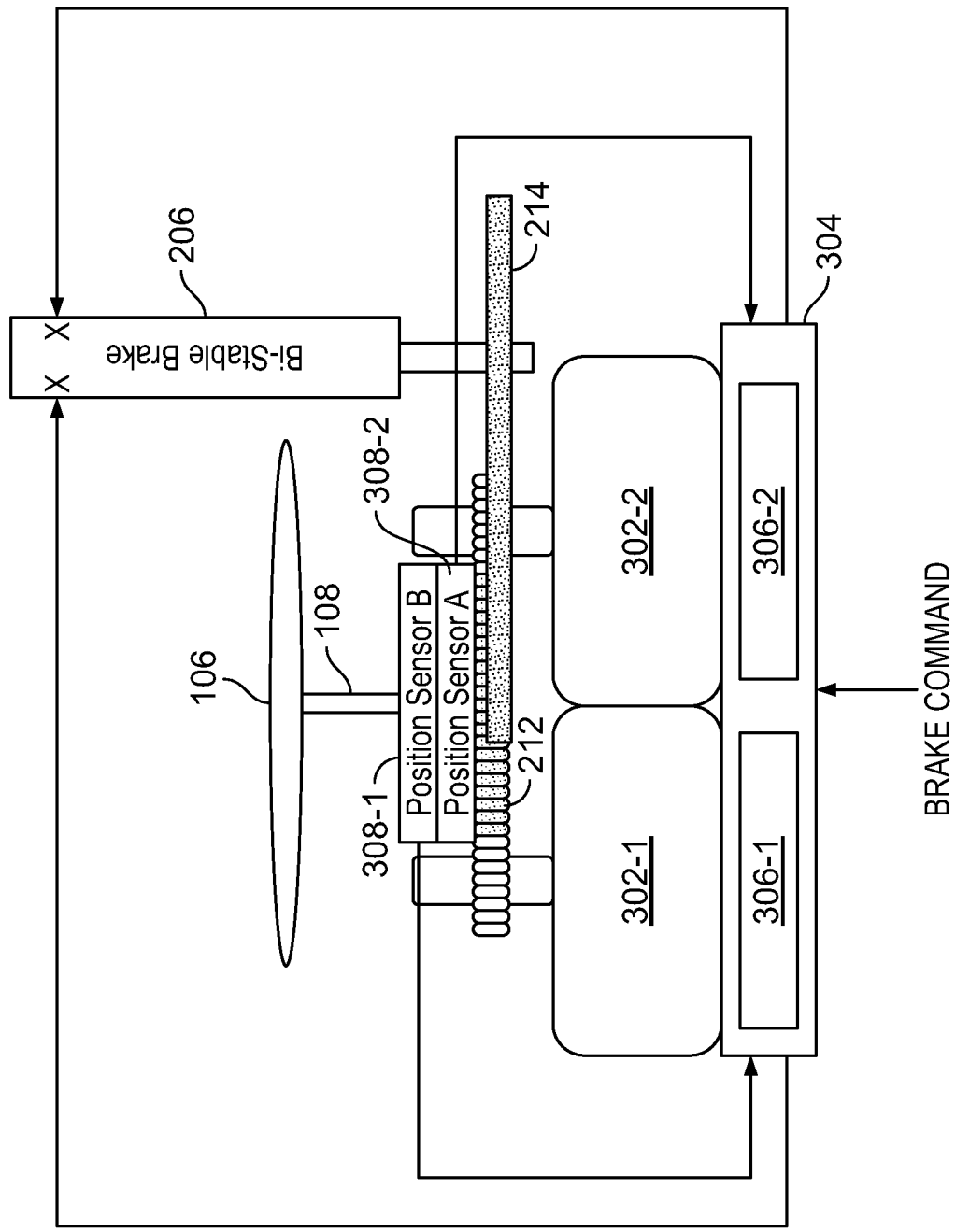
FIG. 3 depicts example of another embodiment a propulsor brake lock system.

Here, too, as FIG. 3 depicts, the dual-channel motor control 304 is in operable communication with the brake assembly 206 and is further configured to selectively command the brake assembly 206 to move between the disengaged position and the engaged position.

As FIG. 3 also depicts, two propeller position sensors 308 may also be included—a first propeller position sensor 308-1 and a second propeller position sensor 308-2. The first propeller position sensor 308-1 is configured to sense a rotational position of the propeller 106 and supply a first propeller position sensor signal indicative thereof to the first channel 306-1. Similarly, the second propeller position sensor 308-2 is configured to sense the rotational position of the propeller and supply a second propeller position sensor signal indicative thereof to the second channel 306-2.

As with the embodiment depicted in FIG. 2, the dual-channel motor control 304 is also coupled to receive the brake command, which may be supplied from an onboard system and/or from a pilot-operated user interface. Thus, when the first channel 306-1 is active, the first channel 306-1 is configured to process the first propeller position signal to determine when the propeller 106 is in the predetermined rotational position and, upon receipt of the brake command, to command the brake assembly 206 to move to the engaged position only when the propeller 106 is in the predetermined position. Moreover, when the second channel 306-2 is active, the second channel 306-2 is configured to process the second propeller position signal to determine when the propeller 106 is in the predetermined rotational position and, upon receipt of the brake command, to command the brake assembly 206 to move to the engaged position only when the propeller 106 is in the predetermined position.

The propulsor lock system 110 described herein will lock one or more lift propulsors in-line during cruise operations of the aircraft and/or when the aircraft is not operating without undue and unwanted battery discharge.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A propulsor brake lock system, comprising:
   an aircraft propulsor including a propeller having a propeller input shaft coupled thereto;
   a reduction gear assembly including at least an input gear and an output gear, the input gear and output gear rotatable with the propeller input shaft;
   a brake shaft coupled to, and rotatable with, the output gear; and
   a brake assembly coupled to the brake shaft, the brake assembly moveable between a disengaged position, in which the brake shaft may rotate whenever the output gear rotates, and an engaged position, in which the brake shaft is prevented from rotating, thereby preventing rotation of the output gear, the input gear, and the propeller input shaft,
   wherein:
   the brake assembly is a bi-stable brake assembly that is adapted to receive an electrical pulse and is configured such that: (i) when the brake assembly is in the disengaged position, upon receipt of the electrical pulse, the brake assembly moves from the disengaged position to the engaged position, and (ii) when the brake assembly is in the engaged position, upon receipt of the electrical pulse, the brake assembly moves from the engaged position to the disengaged position,
   the bi-stable brake assembly is a dual-channel brake, and
   each channel is adapted to selectively receive the electrical pulse.

2. The system of claim 1, further comprising:
   an electric motor coupled to the propeller input shaft and configured to selectively supply torque thereto;
   a motor control in operable communication with the electric motor and configured to selectively energize, and thereby control the torque supplied by, the electric motor.

3. The system of claim 2, wherein the motor control is in operable communication with the brake assembly and is further configured to selectively command the brake assembly to move between the disengaged position and the engaged position.

4. The system of claim 3, further comprising:
   a propeller position sensor configured to sense a rotational position of the propeller and supply a propeller position sensor signal indicative thereof,
   wherein the motor control is coupled to receive a brake command and the propeller position sensor signal and is further configured:
   to process the propeller position signal to determine when the propeller is in a predetermined rotational position, and
   upon receipt of the brake command, to command the brake assembly to move to the engaged position only when the propeller is in the predetermined position.

5. The system of claim 1, further comprising:
   a first electric motor coupled to the propeller input shaft and configured to selectively supply torque thereto;
   a second electric motor coupled to the propeller input shaft and configured to selectively supply torque thereto;
   a dual-channel motor control including a first channel and a second channel, the first channel in operable communication with the first electric motor, the second channel in operable communication with the second electric motor, the dual-channel motor control configured such that:
   only one of the first channel or the second channel is active,
   when the first channel is active, the first channel is operable to selectively energize, and thereby control the torque supplied by, the first electric motor, and
   when the second channel is active, the second channel is operable to selectively energize, and thereby control the torque supplied by, the second electric motor.

6. The system of claim 5, wherein the dual-channel motor control is in operable communication with the brake assembly and is further configured to selectively command the brake assembly to move between the disengaged position and the engaged position.

7. The system of claim 6, further comprising:
   a first propeller position sensor configured to sense a rotational position of the propeller and supply a first propeller position sensor signal indicative thereof;
   a second propeller position sensor configured to sense the rotational position of the propeller and supply a second propeller position sensor signal indicative thereof,
   wherein:
   the first channel is coupled to receive a brake command and the first propeller position sensor signal and the second channel is coupled to receive the brake command and the second propeller position sensor signal,
   when the first channel is active, the first channel is further configured to:
   process the first propeller position signal to determine when the propeller is in a predetermined rotational position, and
   upon receipt of the brake command, to command the brake assembly to move to the engaged position only when the propeller is in the predetermined position; and
   when the second channel is active, the second channel is further configured to:
   process the second propeller position signal to determine when the propeller is in the predetermined rotational position, and
   upon receipt of the brake command, to command the brake assembly to move to the engaged position only when the propeller is in the predetermined position.

8. The system of claim 1, wherein the propellor input shaft includes a spline gear that meshes with the input gear.

9. A propulsor brake lock system, comprising:
   an aircraft propulsor including a propeller having a propeller input shaft coupled thereto;
   a propeller position sensor configured to sense a rotational position of the propeller and supply a propeller position sensor signal indicative thereof;
   a reduction gear assembly including at least an input gear and an output gear, the input gear and output gear rotatable with the propeller input shaft;
   an electric motor coupled to the propeller input shaft and configured to selectively supply torque thereto;
   a brake shaft coupled to, and rotatable with, the output gear;
   a brake assembly coupled to the brake shaft, the brake assembly moveable between a disengaged position, in which the brake shaft may rotate whenever the output gear rotates, and an engaged position, in which the brake shaft is prevented from rotating, thereby preventing rotation of the output gear, the input gear, and the propeller input shaft;

a motor control in operable communication with the electric motor and with the brake assembly and coupled to receive a brake command and the propeller position signal, the motor control configured to:
(i) selectively energize, and thereby control the torque supplied by, the electric motor,
selectively command the brake assembly to move between the disengaged position and the engaged position,
(ii) process the propeller position signal to determine when the propeller is in a predetermined rotational position, and
(ii) upon receipt of the brake command, to command the brake assembly to move to the engaged position only when the propeller is in the predetermined position.

10. The system of claim 9, wherein the brake assembly is a bi-stable brake assembly that is adapted to receive an electrical pulse and is configured such that:
when the brake assembly is in the disengaged position, upon receipt of the electrical pulse, the brake assembly moves from the disengaged position to the engaged position, and
when the brake assembly is in the engaged position, upon receipt of the electrical pulse, the brake assembly moves from the engaged position to the disengaged position.

11. The system of claim 10, wherein:
the bi-stable brake assembly is a dual-channel brake; and
each channel is adapted to selectively receive the electrical pulse.

12. The system of claim 9, wherein the propellor input shaft includes a spline gear that meshes with the input gear.

13. A propulsor brake lock system, comprising:
an aircraft propulsor including a propeller having a propeller input shaft coupled thereto;
a first electric motor coupled to the propeller input shaft and configured to selectively supply torque thereto;
a second electric motor coupled to the propeller input shaft and configured to selectively supply torque thereto;
a first propeller position sensor configured to sense a rotational position of the propeller and supply a first propeller position sensor signal indicative thereof;
a second propeller position sensor configured to sense the rotational position of the propeller and supply a second propeller position sensor signal indicative thereof;
a reduction gear assembly including at least an input gear and an output gear, the input gear and output gear rotatable with the propeller input shaft;
a brake shaft coupled to, and rotatable with, the output gear; and
a brake assembly coupled to the brake shaft, the brake assembly moveable between a disengaged position, in which the brake shaft may rotate whenever the output gear rotates, and an engaged position, in which the brake shaft is prevented from rotating, thereby preventing rotation of the output gear, the input gear, and the propeller input shaft; and a dual-channel motor control in operable communication with the brake assembly and including a first channel and a second channel, the first channel in operable communication with the first electric motor, the second channel in operable communication with the second electric motor, the dual-channel motor control configured such that:
only one of the first channel or the second channel is active,
when the first channel is active, the first channel is operable to selectively energize, and thereby control the torque supplied by, the first electric motor,
when the second channel is active, the second channel is operable to selectively energize, and thereby control the torque supplied by, the second electric motor, and
wherein:
the first channel is coupled to receive a brake command and the first propeller position sensor signal and the second channel is coupled to receive the brake command and the second propeller position sensor signal,
when the first channel is active, the first channel is further configured to:
process the first propeller position signal to determine when the propeller is in a predetermined rotational position, and
upon receipt of the brake command, to command the brake assembly to move to the engaged position only when the propeller is in the predetermined position, and
when the second channel is active, the second channel is further configured to:
process the second propeller position signal to determine when the propeller is in the predetermined rotational position, and
upon receipt of the brake command, to command the brake assembly to move to the engaged position only when the propeller is in the predetermined position.

14. The system of claim 13, wherein the brake assembly is a bi-stable brake assembly that is adapted to receive an electrical pulse and is configured such that:
when the brake assembly is in the disengaged position, upon receipt of the electrical pulse, the brake assembly moves from the disengaged position to the engaged position, and
when the brake assembly is in the engaged position, upon receipt of the electrical pulse, the brake assembly moves from the engaged position to the disengaged position.

15. The system of claim 14, wherein:
the bi-stable brake assembly is a dual-channel brake; and
each channel is adapted to selectively receive the electrical pulse.

16. The system of claim 13, wherein the propellor input shaft includes a spline gear that meshes with the input gear.

* * * * *